US008091386B2

(12) United States Patent
Plate

(10) Patent No.: US 8,091,386 B2
(45) Date of Patent: Jan. 10, 2012

(54) RECYCLED GLASS ITEMS AND METHOD OF MAKING

(76) Inventor: Kathleen Marie Plate, Atlanta, GA (US)

( * ) Notice: Subject to any disclaimer, the term of this patent is extended or adjusted under 35 U.S.C. 154(b) by 888 days.

(21) Appl. No.: 11/998,277

(22) Filed: Nov. 29, 2007

(65) Prior Publication Data

US 2009/0139266 A1 Jun. 4, 2009

(51) Int. Cl.
*C03B 33/06* (2006.01)

(52) U.S. Cl. .......................................................... 65/112

(58) Field of Classification Search ..................... 65/112
See application file for complete search history.

(56) References Cited

U.S. PATENT DOCUMENTS

| | | | | |
|---|---|---|---|---|
| 2,324,737 | A * | 7/1943 | Stevens et al. | 83/16 |
| 3,652,253 | A | 3/1972 | Small | |
| 3,795,162 | A | 3/1974 | Jaeger | |
| 3,805,647 | A * | 4/1974 | Blanc | 82/84 |
| 3,839,006 | A | 10/1974 | Pikor | |
| 4,443,925 | A | 4/1984 | Fish | |
| 4,457,200 | A | 7/1984 | Borzym | |
| 5,332,411 | A | 7/1994 | Ogata et al. | |
| 5,511,648 | A | 4/1996 | Kaminski et al. | |
| 5,791,217 | A | 8/1998 | Dundas et al. | |
| 5,817,162 | A | 10/1998 | Penrith | |
| 6,233,973 | B1 | 5/2001 | Monchatre | |
| 6,811,477 | B2 * | 11/2004 | Funakubo | 451/524 |
| 7,059,154 | B1 | 6/2006 | Quentin et al. | |
| 7,318,329 | B2 * | 1/2008 | Penrith | 65/108 |
| 2002/0108401 | A1 * | 8/2002 | Horne | 65/102 |
| 2006/0174654 | A1 * | 8/2006 | Penrith | 65/56 |

OTHER PUBLICATIONS

Wuvie, Aug. 27, 2007, "How to use a wet tile saw to cut glass bottles", <http://www.instructables.com/id/How-to-use-a-wet-tile-saw-to-cut-glass-bottles/>.*

Mike Firth, "Bottle Cutting & Sawing, Drilling, Slumping, & Blowing", Mar. 20, 2007, <http://mikegigi.com/bottle.htm>.*

K.T. Bondarev and I. V. Malevannyi, "Cutting Glass by Abrasive Saws", Glass and Ceramics, 1956, vol. 13, No. 8, pp. 372-375.*

DelphiGlass, "Bandsaws", Nov. 7, 2006, http://www.delphiglass.com/index.cfm?page=itemlist&viewcat=2441.*

Judy Sizemore, "Make Recycled-Glass Wind Chimes", Mother Earth News, Mar./Apr. 1980, http://www.motherearthnews.com/Do-It-Yourself/1980-03-01/Make-Recycled-Glass-Wind-Chimes.aspx.*

M. Bradley Walker, "Glass Saws", Warm Glass, Jan. 24, 2001, http://www.warmglass.com/glass_saws.htm.*

M. Bradley Walker, "Glass Polishing", Warm Glass, Jan. 24, 2001, http://www.warmglass.com/glass_polishing.htm.*

Kimberlianne, "Recycled glass bottle wind chimes by Kimberlianne", Dave's Garden Forum, Mar. 6, 2007, http://davesgarden.com/community/forums/t/699137/.*

* cited by examiner

*Primary Examiner* — Matthew Daniels
*Assistant Examiner* — Cynthia Szewczyk
(74) *Attorney, Agent, or Firm* — Collen A. Beard

(57) ABSTRACT

A method of making decorative glass objects of any of a wide variety of appearances, structures and functions teaches that recycled glass bottles may be cut into disks, rings and other shapes using a diamond dust blade on a bandsaw, then firing the glass objects in a glass kiln to the point of slumping but not to melting, and finally by grinding the objects with a diamond head glass grinder. Glass objects made by the method of the invention betray their recycled origins with an eye-pleasing organic quality to finish and shape.

10 Claims, 4 Drawing Sheets

RECYCLED GLASS ITEMS AND METHOD OF MAKING

STATEMENT REGARDING FEDERALLY FUNDED RESEARCH

This invention was not made under contract with an agency of the US Government, nor by any agency of the US Government.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

CROSS-REFERENCE TO RELATED APPLICATIONS

N/A

FIELD OF THE INVENTION

This invention relates generally to glass making methods and devices, and specifically to processes of making self supporting glass articles with mechanical shaping or subdividing.

BACKGROUND OF THE INVENTION

Glass recycling has not up until now involved creation of decorative glass items, nor has it used sawing (due to the fact that very few acceptable saws existed until recently, and that the saws in use previously did not allow fine work).

A search in USPTO class 65 reveals very little of interest to the useful recycling of glass bottles into useful items by means of sawing.

U.S. Pat. No. 5,791,217 issued Aug. 11, 1998 to Dundas et al teaches methods dealing with the manufacture of plastic bottles, not relevant to recycling of glass bottles.

U.S. Pat. No. 5,511,648 issued to Kaminski et al on Apr. 20, 1986 teaches methods of manufacturing, in particular cutting flashing from plastic bottles not relevant to glass bottles.

U.S. Pat. No. 4,457,200 issued Jul. 3, 1984 to Borzym teaches methods of cutting heavy walled articles such as pipes using rams and the like, and is unlikely to produce anything but shards if applied to glass.

U.S. Pat. No. 4,443,925 issued to Fish on Apr. 24, 1984 at least deals with cutting up bottles for recycling, unfortunately, it deals with completely different cutting angles and techniques needed for plastic bottles, not glass, and produces no utilitarian object as a final product.

U.S. Pat. No. 3,795,162 issued to Jaeger on Mar. 25, 1974 teaches a sharp edged arm for trimming flashing from plastic bottles and is irrelevant to recycling or glass manufacture.

U.S. Pat. No. 7,059,154 issued Jun. 13, 2006 to Quentin et al teaches methods of making glass sheets having little relevance to recycling of glass bottles into multiple smaller objects.

U.S. Pat. No. 6,233,973 issued to Monchatre on May 22, 2001 teaches molding of glass containers, not recycling of glass containers into different objects.

U.S. Pat. No. 5,817,162 issued Oct. 6, 1998 to Penrith teaches that a glass bottle may be severed in sections and then the sections glued or fused together to make a goblet. It does not teach anything regarding making a plurality smaller glass items from the bottle, nor kiln firing, etc.

U.S. Pat. No. 5,332,411 issued to Ogata et al on Jul. 26, 1994 teaches an electrical method of glass cutting not relevant to recycling.

U.S. Pat. No. 3,839,006 issued Oct. 1, 1974 to Pikor teaches a hot shock apparatus rather than any cutting saw or recycling structures.

U.S. Pat. No. 3,652,253 issued Mar. 28, 1972 to Small merely teaches an improved nozzle.

It would be advantageous to provide a method of cutting a glass bottle into a multiplicity to smaller useful glass items.

It would further be advantageous to provide a method of decoratively recycling glass bottles after initial use, without merely reducing them to bulk glass.

It would yet further be advantageous to provide a method of making glass rings, discs and other shapes with a pleasing appearance.

SUMMARY OF THE INVENTION

General Summary

A method of making decorative glass objects of any of a wide variety of appearances, structures and functions teaches that recycled glass bottles may be cut into disks, rings and other shapes using a diamond dust blade on a bandsaw. The recently developed glass bandsaw allows an unprecedented degree of control and allows fine work with very low rates of spoilage.

The glass objects cut from a recycled glass bottle may be fired in a glass kiln to the point of slumping or deforming but not to the point of actually melting and running. This requires careful control of the time and temperature of firing, as too much heat for too long will cause the glass to melt, puddle and eventually run, while too little heat does almost nothing.

Finally, the glass objects created using the method of the invention are treated by grinding the objects with a diamond head glass grinder.

Glass objects made by the method of the invention betray their recycled origins with an eye-pleasing organic quality to finish and shape. The objects are made of virtually valueless recycled materials but may have notable artistic value.

Summary in Reference to Claims

It is therefore another aspect, advantage, objective and embodiment of the invention, in addition to those discussed previously, to provide a method of manufacturing annular glass bodies, the method comprising the steps of;

- providing a glass bottle work piece having at least one open end;
- positioning the glass bottle on a bed of a bandsaw having a cutting position;
- feeding the glass bottle into the cutting position open end first; and
- cutting through the open end of the glass bottle, whereby an annular glass body is cut from the open end of the bottle.

It is therefore another aspect, advantage, objective and embodiment of the invention to provide a method further comprising:

- repositioning the glass bottle on the bed of the bandsaw;
- feeding the glass bottle into the cutting position with the previously cut end first, and cutting through the cut end of the glass bottle, whereby a second annular glass body is cut from the open end of the bottle.

It is therefore another aspect, advantage, objective and embodiment of the invention to provide a method further comprising:

repeating these steps a plurality times, until the glass bottle is substantially consumed.

It is therefore another aspect, advantage, objective and embodiment of the invention to provide a method further comprising:

firing in a kiln the annular glass body cut from the open end of the bottle.

It is therefore another aspect, advantage, objective and embodiment of the invention to provide a method further comprising:

firing the annular glass body until it slumps.

It is therefore another aspect, advantage, objective and embodiment of the invention to provide a method further comprising:

grinding the annular glass body.

It is therefore another aspect, advantage, objective and embodiment of the invention to provide a method further comprising:

grinding the annular glass body with a diamond bit glass grinder.

It is therefore yet another aspect, advantage, objective and embodiment of the invention to provide a method wherein the step of providing a glass bottle work piece further comprises:

providing a bottle which has been previously used.

It is therefore another aspect, advantage, objective and embodiment of the invention to provide a method wherein the step of positioning the glass bottle on the bed of the bandsaw further comprises:

positioning the bottle by hand.

It is therefore another aspect, advantage, objective and embodiment of the invention to provide a method wherein the step of positioning the glass bottle on the bed of the bandsaw further comprises:

positioning the bottle mechanically.

It is therefore another aspect, advantage, objective and embodiment of the invention to provide a method wherein the step of feeding the glass bottle into the cutting position further comprises:

feeding the bottle by hand

It is therefore another aspect, advantage, objective and embodiment of the invention to provide a method wherein the step of feeding the glass bottle into the cutting position further comprises:

feeding the bottle mechanically.

It is therefore another aspect, advantage, objective and embodiment of the invention to provide a method further comprising:

water cooling the glass bottle work piece during cutting.

INDEX OF THE REFERENCE NUMERALS

Figure 1:
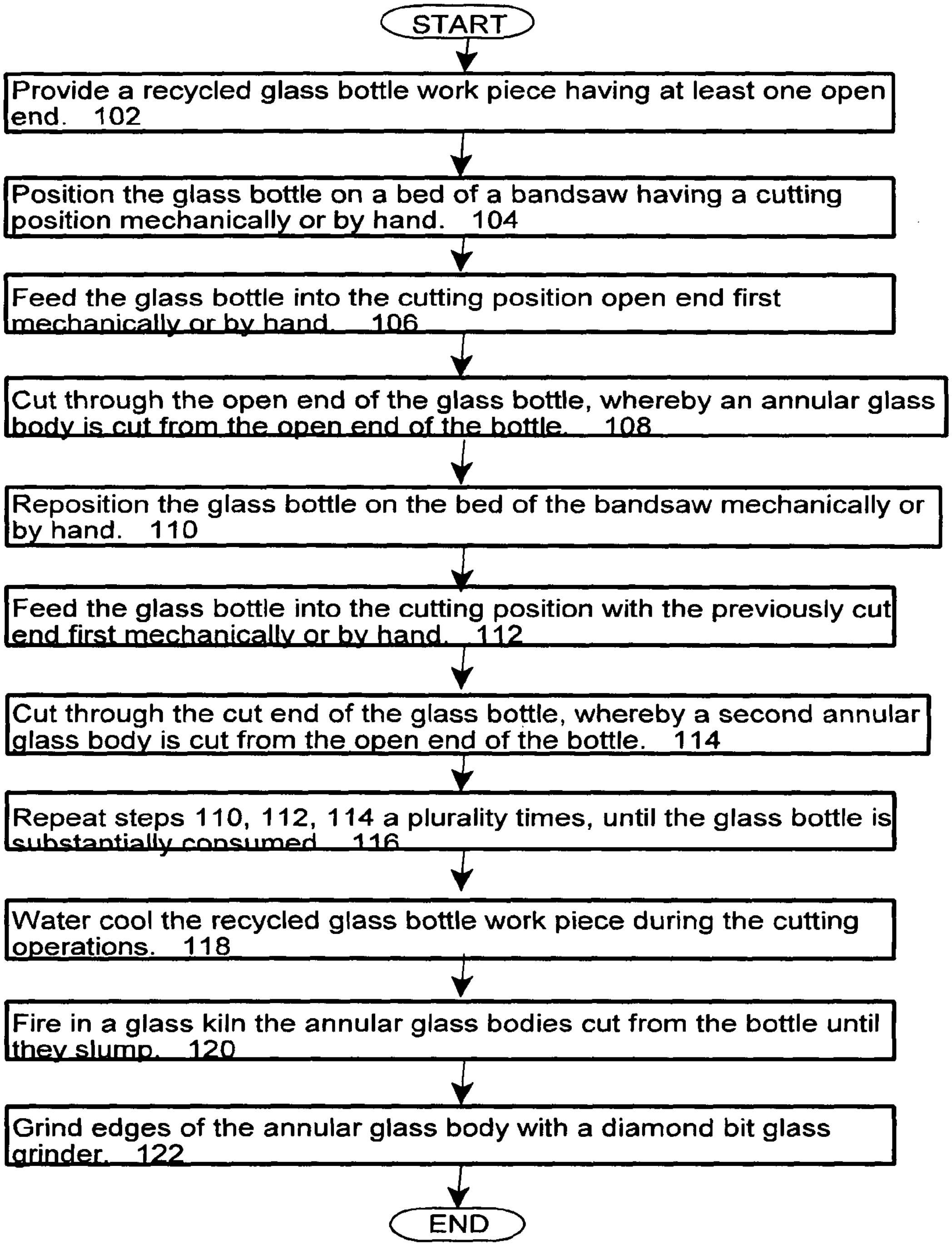
FIG. 1 is a block diagram of a first method embodiment of the invention, showing steps of the preferred embodiment.

102 Provide a recycled glass bottle work piece having at least one open end.
104 Position the glass bottle on a bed of a bandsaw having a cutting position mechanically or by hand.
106 Feed the glass bottle into the cutting position open end first mechanically or by hand.
108 Cut through the open end of the glass bottle, whereby an annular glass body is cut from the open end of the bottle.
110 Reposition the glass bottle on the bed of the bandsaw mechanically or by hand.
112 Feed the glass bottle into the cutting position with the previously cut end first mechanically or by hand.
114 Cut through the cut end of the glass bottle, whereby a second annular glass body is cut from the open end of the bottle.
116 Repeat the steps 110, 112, 114 a plurality times, until the glass bottle is substantially consumed.
118 Water cooling the recycled glass bottle work piece during the cutting operations.
120 Firing in a glass kiln the annular glass bodies cut from the bottle until they slump.
122 Grinding edges of the annular glass body with a diamond bit glass grinder.
202 Band saw
204 Bed
206 Cutting position
208 Recycled glass bottle work piece
210 Open end
212 Blade
214 Annular glass body
302 Glass kiln
304 Glass bodies
402 Glass body
404 Diamond bit glass grinder

DETAILED DESCRIPTION

Until now, recycling of glass products normally meant melting down the glass and reusing it, often as a lower grade of glass. In the decorative glass industries, recycling of glass products still usually required a smelting of the glass.

Working with glass products, particularly fashion and home accessories such as coasters, ear-rings, shower rings, ornamentation for household items like pillows, curtains, sun catchers, tableware, wind chimes, window string decorations, hangers, mobiles, napkin holders, vases, belts, jewelry and the like normally required glass blowing operations. In the decorative glass industries, very little work has been done using saws on glass work.

A band saw (also 'bandsaw') is a saw device having a flexible cutting blade manufactured in a belt shape, so as to be endless. The blade is normally toothed, which causes the blade to be suitable for metals and woods but unsuitable for cutting of delicate items such as glass. The blade is carried by and rides upon to two rollers, races, gears or wheels which hold it in the proper tension and normally also rotate so as to induce the belt blade to move. One side (normally the uptake side) of the device may be shielded from access for safety reasons or both sides of the blade (ascending and descending or both directions for horizontal band saws) may be available for cutting operations.

Because the width of the blade can be extremely narrow, the work piece which is being cut on the bed of the saw may be rotated with a great deal of freedom in a plane orthogonal to the blade, allowing skillful operators to create an almost unlimited range of cut shapes. Fretwork is one typical example of what may be produced with a bandsaw.

Bandsaws have traditionally been used for wood and metal working, being particularly prized because they cut a very narrow kerf (a narrow portion of the work piece is removed by the blade) and thus avoid wasting material. Bandsaws may be placed under automated control systems for factory type production, although they are frequently used in situations requiring skill or artistry of cutting.

Until recently, bandsaws were not normally available for work with glass work pieces. Ring saws and wire saws were more commonly used for cutting glass. Ring saws use a narrow ring-shaped blade for cutting, and for straight line cuts, can cut any depth, however for detailed complex cuts, the maximum depth of the cut is naturally limited to the radius of the ring-blade. Reciprocating wire saws, as the name implies, use a blade which reciprocates and thus wire saws cut fairly slowly.

Bandsaws with blades suitable for cutting glass have only recently arrived on the commercial market as usable items. The blades of glass band saws are coated with diamond dust and have relatively small teeth or no teeth at all, and are able to cut glass with an accuracy and speed which are unmatched by older types of glass saws. This results in the ability to do more finely grained work on glass, and additionally allows a notably lower rate of spoilage of work pieces. In addition, as the return loop of the belt-blade may be positioned a considerable distance from the cutting potion of the loop, a larger size of item may be cut than with a ring saw. (Depending on the band saw and ring saw compared, the reverse may be true.) Normally, such bandsaws have been used for work on stained glass windows, no use of them in glass recycling is yet known.

Typical bandsaws may be equipped with a bed on which the work piece is positioned for cutting, specifically including a cutting position at which the work piece will be brought into contact with the fast moving blade. Other accessories of bandsaws include roller beds allowing larger work pieces to be rolled into position, water jets to cool the work piece during operations, mechanical feeding and positioning devices, clamps, vices, automated control systems and combinations thereof.

FIG. 1 is a block diagram of a first method embodiment of the invention, showing steps of the preferred embodiment. At step 102 the method calls for providing of a recycled glass bottle work piece having at least one open end. The amount of recycling needed in advanced societies is increasing exponentially, the method of the present invention allows an artistic recycling that does not require that entire recycled bottle be melted down, and results in ornamental objects having additional value beyond that of raw glass.

At step 104, the method positions the glass bottle on a bed of a bandsaw having a cutting position: the positioning may occur mechanically or by hand. The recycled bottle is then fed into the cutting position open end first at step 106, again, either mechanically or by hand. Vices and clamps and similar arrangements may be used.

Step 108 comprises cutting through the open end of the glass bottle, whereby an annular glass body is cut from the open end of the bottle. In alternative embodiments, the bottle may be cut with the bandsaw into a group of discs.

Repositioning the glass bottle on the bed of the bandsaw (step 110) (mechanically or by hand again) is necessary if it is desired to cut more than a single ring or disc from the bottle. In the best mode now contemplated and preferred embodiment at the present time, the use of substantially all of the bottle is used. (Substantially all refers to a major portion of the bottle or a majority of the glass of the bottle. Some parts may not be used even if substantially all of the bottle is consumed by the cutting process.)

At step 112, the invention teaches feeding the glass bottle into the cutting position with the previously cut end first, again, using machinery or by hand. It is worth noting for any steps of the present invention, the machinery such as feeders, positioners and the glass bandsaw itself may be controlled by automated systems such as a CPU, cam, or the like.

Following the method, the bandsaw is then used to cut through the already cut end of the glass bottle, whereby a second annular glass body is cut from the open end of the bottle. (Step 114)

Repetition of the steps 110, 112, 114 a plurality times, until the glass bottle is substantially consumed, allows the creation of a large number of rings from a single bottle.

Water cooling the recycled glass bottle work piece during the cutting operations may be used, this is depicted as step 118 but may be taken to be occurring continuously during the cutting or intermittently, during some cuts and not others and so on.

With cutting operations complete, the bandsaw typically leaves some fairly sharp edges on the annular bodies (ring shaped glass bodies) created by the process of the invention. In addition, the bodies may have an aesthetically unpleasing appearance as they may very clearly show their provenance: a more unfinished or more natural look may be desirable.

Firing in a glass kiln the annular glass bodies cut from the bottle is depicted at step 120. Other types of ovens and kilns may be used. One important differentiation from previous methods is the exact degree of control of the kiln firing operation. In particular, it is possible to fire a ceramic or glass object to a temperature which causes crystalline changes in the microscopic structure of the item without shape changes, this is commonly used in ceramic ware creation. On the other hand, a glass object (glass always being (in some senses) an extremely viscous liquid in any case) may easily be melted and deformed beyond all recognition. It is preferable according to the invention to fire the glass objects created by firing them until they “slump”.

For purposes of this application, the term “slump” means that the item becomes slightly malleable, deforms to a limited extent, and may begin to melt but without entirely losing the ability to support itself in its prior shape. The result of the deformation is that the ring-shaped body of the invention may stay ring shaped but become more organic in shape and have edges which become curves, or have the edges disappear altogether. A disc shaped body will become a rather flattened oblate spheroid or a “pebble shape”.

Step 122, the grinding of the edges of the annular glass body with a diamond bit glass grinder, is used to make sure that no sharp edges remain, to impart a final look or feel to the glass bodies of the invention, to alter the shape and so on. A diamond bit glass grinder is preferable, like a diamond dust band saw blade, as it very easily works the glass down without nearly the same danger of wastage or spoilage as traditional instruments.

Figure 2:
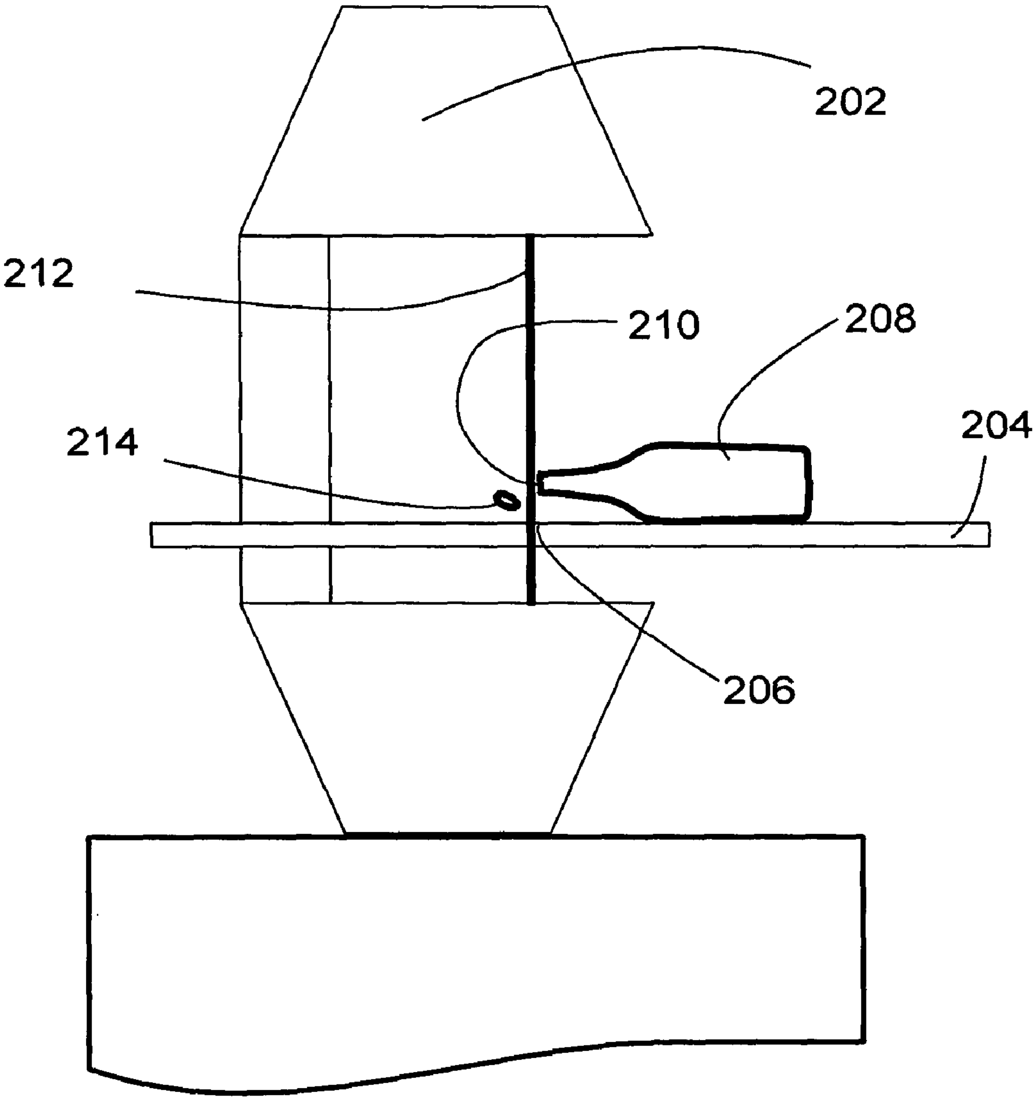
FIG. 2 is a side view of a second embodiment of the device of the invention, a stage in the method of the invention, showing a recycled bottle in the cutting position on the bed of a bandsaw.

FIG. 2 is a side view of a second embodiment of the device of the invention, a stage in the method of the invention, showing a recycled bottle in the cutting position on the bed of a bandsaw.

Band saw 202 has bed 204 which in turn has a location at blade 212 where an object on the bed 204 will be cut by blade 212. This location is designated as the "cutting position" 206 for purposes of this invention.

Recycled glass bottle work piece 208 may have at least one open end 210. When blade 212 cuts through the glass bottle work piece in a straight line orthogonal to the axis of the bottle, an annular body is produced, as shown by annular glass body 214 on the diagram FIG. 2. However, if the work piece is rotated as it is fed through the blade 212, a disc or other shape may be cut.

Figure 3:
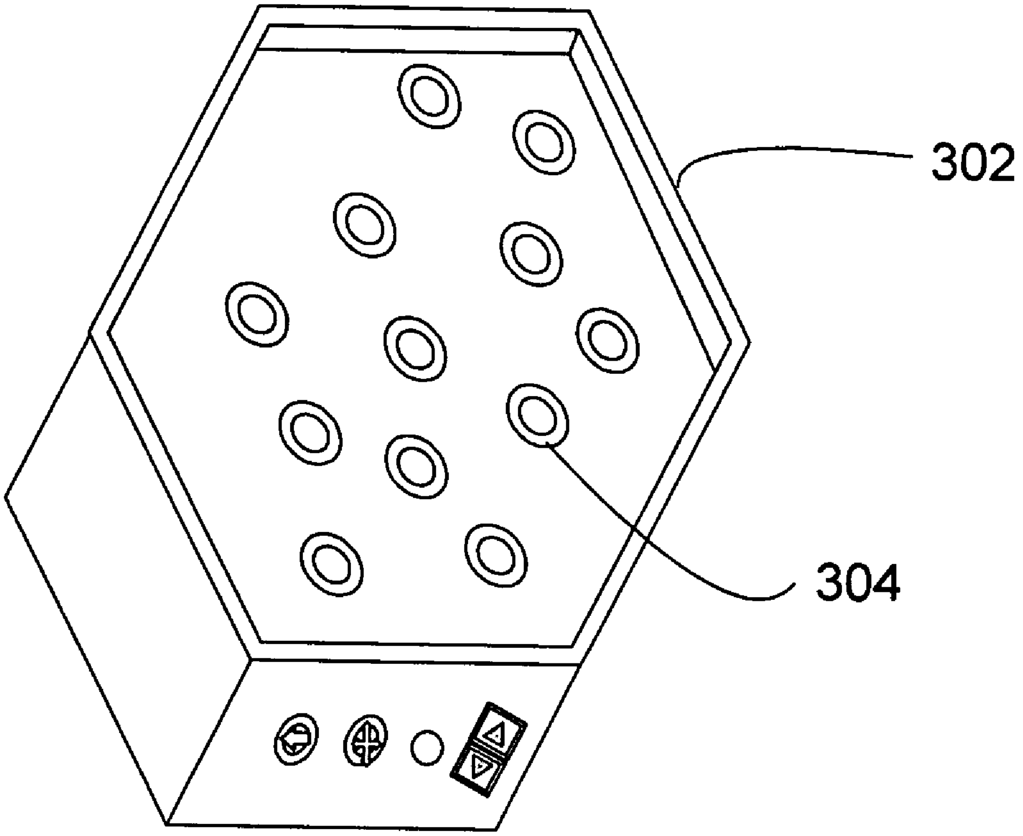
FIG. 3 is a perspective elevational side view of a third embodiment of the device, an intermediate stage of the method of the invention, showing a plurality of annular glass bodies in a kiln.

FIG. 3 is a perspective elevational side view of a third embodiment of the device, an intermediate stage of the method of the invention, showing a plurality of annular glass bodies in a kiln.

Glass kiln 302 may be seen to have glass bodies 304 therein, being fired in order to bring them to the narrow range of time and temperature which induces "slumping" rather than melting.

Figure 4:
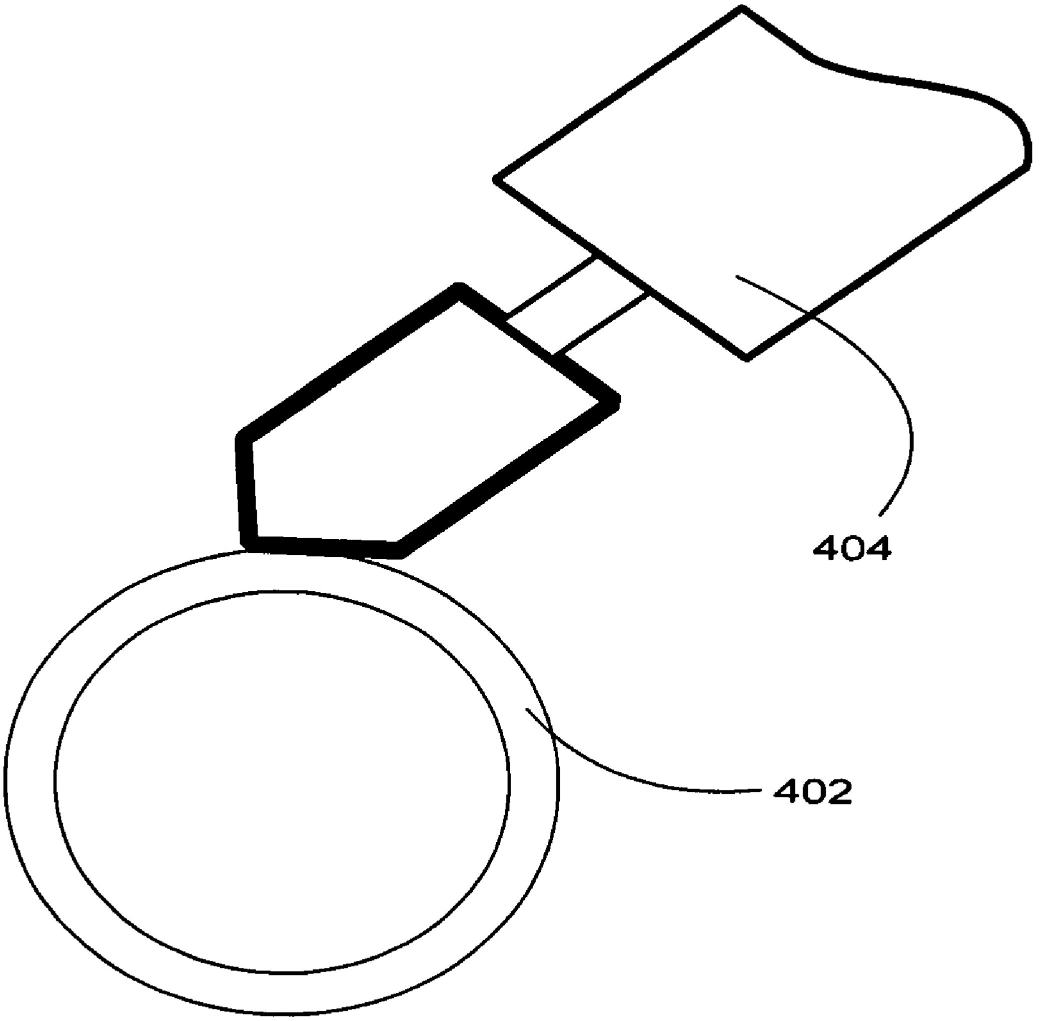
FIG. 4 is a perspective elevational view of a fourth embodiment of the device, a late stage of the method of the invention, showing an annular glass body being abraded at any edges which may remain.

FIG. 4 is a perspective elevational view of a fourth embodiment of the device, a late stage of the method of the invention, showing an annular glass body being abraded at any edges which may remain.

Glass body 402 is being ground down with diamond bit glass grinder 404. Note that while glass body 402 is shown as an annular shaped body, it may be disc shaped or other shapes, and while it is depicted as being regular, in fact it will usually have a pleasingly organic appearance instead.

In the presently preferred embodiment and best mode presently contemplated for carrying out the invention, the steps of Table One are used in the creation of the glass ring, disk, or other body.

Table One

1. Providing a recycled glass bottle work piece having at least one open end.
2. Positioning the glass bottle on a bed of a bandsaw having a cutting position mechanically or by hand.
3. Feeding the glass bottle into the cutting position open end first mechanically or by hand.
4. Cutting through the open end of the glass bottle, whereby an annular glass body is cut from the open end of the bottle.
5. Repositioning the glass bottle on the bed of the bandsaw mechanically or by hand.
6. Feeding the glass bottle into the cutting position with the previously cut end first mechanically or by hand.
7. Cutting through the cut end of the glass bottle, whereby a second annular glass body is cut from the open end of the bottle.
8. Repeating the steps 5, 6 and 7a plurality times, until the glass bottle is substantially consumed.
9. Water cooling the recycled glass bottle work piece during the cutting operations.
10. Firing in a glass kiln the annular glass bodies cut from the bottle until they slump.
11. Grinding edges of the annular glass body with a diamond bit glass grinder.

End Table One

The disclosure is provided to allow practice of the invention by those skilled in the art without undue experimentation, including the best mode presently contemplated and the presently preferred embodiment. Nothing in this disclosure is to be taken to limit the scope of the invention, which is susceptible to numerous alterations, equivalents and substitutions without departing from the scope and spirit of the invention. The scope of the invention is to be understood from the appended claims.

What is claimed is:

1. A method of manufacturing annular glass bodies, the method comprising the steps of;

providing a glass bottle work piece having at least one open end;

positioning the glass bottle on a bed of a bandsaw having a cutting position;

feeding the glass bottle into the cutting position open end first;

cutting through the open end of the glass bottle, whereby an annular glass body is cut from the open end of the bottle;

firing the annular glass body in a kiln until it slumps without losing the ability to support itself in its prior shape;

grinding the annular glass body; and assembling the annular glass body into an article.

2. The method of claim 1, further comprising:

repositioning the glass bottle on the bed of the handsaw;

feeding the glass bottle into the cutting position with the previously cut end first, and cutting through the cut end of the glass bottle, whereby a second annular glass body is cut from the open end of the bottle.

3. The method of claim 2, further comprising:

repeating the steps of claim 2 a plurality of times, until the glass bottle is substantially consumed.

4. The method of claim 1, further comprising:

grinding the annular glass body with a diamond bit glass grinder.

5. The method of claim 1, wherein the step of providing a glass bottle work piece further comprises:

providing a bottle which has been previously used.

6. The method of claim 1, wherein the step of positioning the glass bottle on the bed of the bandsaw further comprises:

positioning the bottle by hand.

7. The method of claim 1, wherein the step of positioning the glass bottle on the bed of the handsaw further comprises:

positioning the bottle mechanically.

8. The method of claim 1, wherein the step of feeding the glass bottle into the cutting position further comprises:

feeding the bottle by hand.

9. The method of claim 1, wherein the step of feeding the glass bottle into the cutting position further comprises:

feeding the bottle mechanically.

10. The method of claim 1, further comprising:

water cooling the glass bottle work piece during cutting.

* * * * *